United States Patent
Kanak et al.

(10) Patent No.: US 8,799,616 B2
(45) Date of Patent: Aug. 5, 2014

(54) METHOD AND SYSTEM FOR PREFERRED CPU BINDING ON VIRTUAL PARTITIONS

(75) Inventors: Anjali Anant Kanak, Bangalore (IN); Mohan Parthasarathy, Bangalore (IN); Chandrashekhara Anandamurthy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 12/619,700

(22) Filed: Nov. 17, 2009

(65) Prior Publication Data

US 2011/0055514 A1    Mar. 3, 2011

(30) Foreign Application Priority Data

Aug. 27, 2009    (IN) .......................... 2066/CHE/2009

(51) Int. Cl.
- *G06F 12/02*    (2006.01)
- *G06F 9/455*    (2006.01)
- *G06F 9/50*    (2006.01)

(52) U.S. Cl.
CPC .......... *G06F 9/45533* (2013.01); *G06F 9/5077* (2013.01)
USPC ................................... 711/173; 711/E12.084

(58) Field of Classification Search
None
See application file for complete search history.

(56) References Cited

U.S. PATENT DOCUMENTS

| | | | |
|---|---|---|---|
| 6,226,734 B1 * | 5/2001 | Kleinsorge et al. | 712/13 |
| 6,247,109 B1 | 6/2001 | Kleinsorge et al. | |
| 2006/0010450 A1 * | 1/2006 | Culter | 718/104 |
| 2006/0101224 A1 * | 5/2006 | Shah et al. | 711/173 |
| 2008/0307425 A1 * | 12/2008 | Tripathi | 718/104 |

OTHER PUBLICATIONS

"Introducing HP-UX 11i Virtual Partitions", Hewlett-Packard Development Company, L.P.; Aug. 26, 2005.
Nick Harris et al., "LPAR Configuration and Management", IBM Corporation, Apr. 2002.

* cited by examiner

*Primary Examiner* — Denise Tran

(57) ABSTRACT

A method and system for binding a preferred CPU to a virtual partition of a computer is disclosed. In one embodiment, a preferred CPU for a virtual partition of a computer is determined upon a receipt of a request to assign a CPU to the virtual partition. Then, the preferred CPU is assigned to the virtual partition when the preferred CPU is available for assignment. Further, the preferred CPU is retained in the virtual partition when the virtual partition is rebooted.

11 Claims, 8 Drawing Sheets

METHOD AND SYSTEM FOR PREFERRED CPU BINDING ON VIRTUAL PARTITIONS

RELATED APPLICATIONS

Benefit is claimed under 35 U.S.C. 119(a)-(d) to Foreign application Serial No. 2066/CHE/2009 entitled "Method And System For Preferred CPU Binding on Virtual Partitions" by Hewlett-Packard Development Company, L.P., filed on 27 Aug., 2009, which is herein incorporated in its entirety by reference for all purposes

BACKGROUND

A computer system, for example, a server, a work station, a personal computer, a laptop, etc., may be divided into multiple partitions to efficiently utilize its use. For example, the computer system may be divided into multiple hardware partitions where each hardware partition runs its own application and operating system (OS) instance. This may increase the utilization of the computer system. To form a hardware partition, one or more central processing units (CPUs) or processors, and input/output (I/O) interfaces as well as a memory may be dedicated. As each hardware partition may be isolated from other hardware partitions, working partitions may be safeguarded from the effect of faulty ones.

By the same token, a virtual partition may be a software partition of the computer system where each virtual partition contains an independent instance of an OS. Typically, the virtual partition may be created using resources from one or more cells, where a cell or a cellular platform may be a basic building block of each hardware partition with at least one CPU and an I/O interface as well as a memory. Like the hardware partition, the virtual partition runs its own application and OS instance while isolating its operation from other virtual partitions. However, unlike the hardware partition, resources, such as CPUs, may be dynamically added or deleted from the virtual partition, thus making the virtual partition more flexible than the hardware partition. The dynamic addition or deletion of CPUs may be referred to as CPU migration.

Typically, in a non-uniform memory architecture (NUMA), memory access time may depend on the location of a CPU relative to a memory being accessed by the CPU. Thus, for a faster memory access in the virtual partition, CPUs local to a dedicated memory for the virtual partition may need to be assigned at the time of creation of the virtual partition or at run time. However, the CPU assignment for a faster memory access time may not be possible in a count-based CPU assignment, where a specified number of CPUs may be randomly assigned to the virtual partition from available CPUs using a resource manager. Although one or more CPUs that are proximal to the memory may be added to or deleted from the virtual partition by directly specifying their identifiers, the assigned CPUs may not be retained across reboots of the virtual partition.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A method and system for preferred CPU binding on virtual partitions is disclosed. According to various embodiments of the present invention, CPUs may be soft bound or preferred for assignment to a virtual partition of a computer. The present invention may facilitate the CPUs to be hard bound or soft bound to the virtual partition, thus allowing a user to gain fine-grained control over CPU migrations from one virtual partition to another. Also, the present invention may allow the preferred CPUs assigned to the virtual partition to be retained across reboots. Moreover, the present invention may facilitate reduction in memory access time by assigning CPUs local to a memory of the virtual partition.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
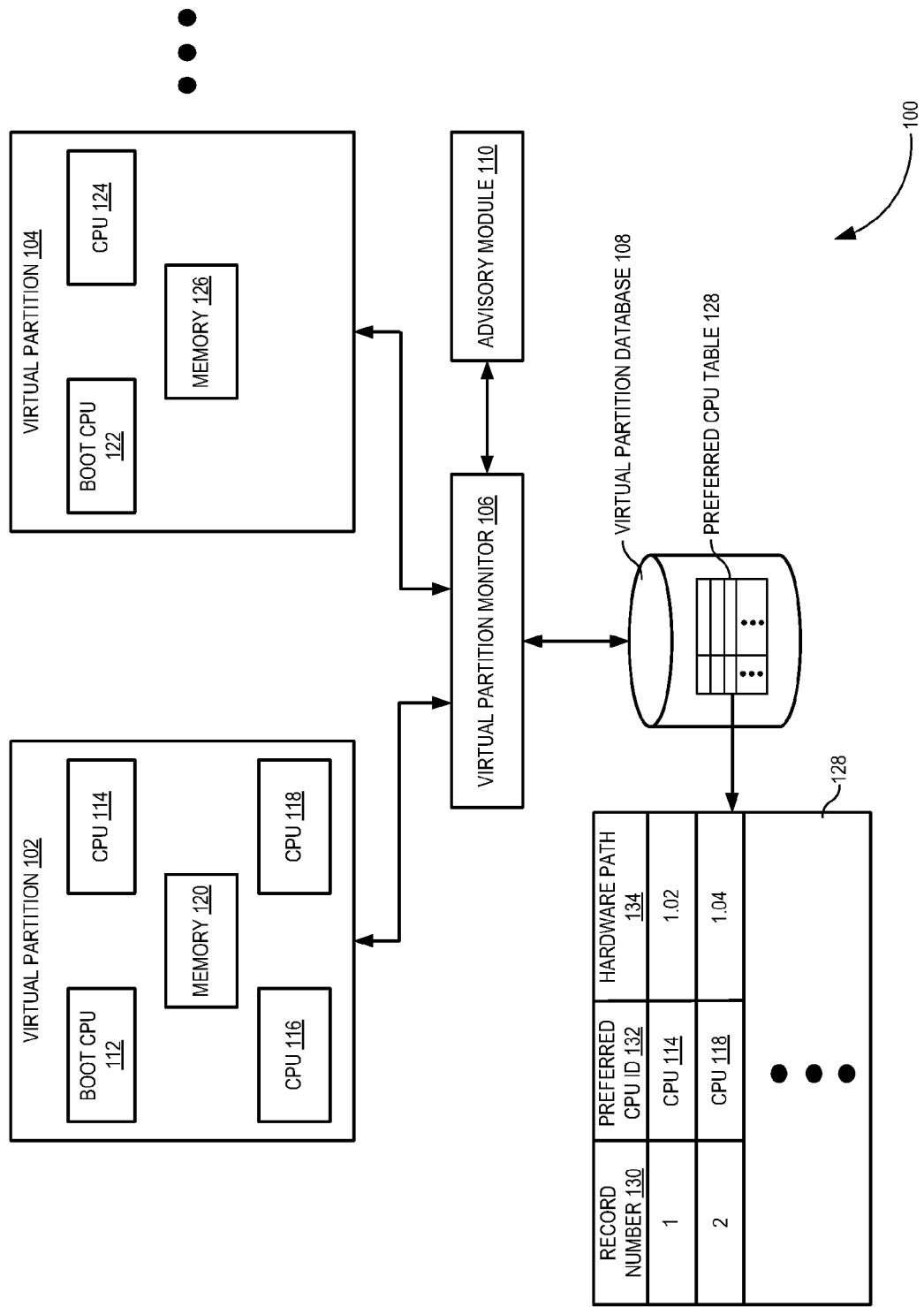
FIG. 1 illustrates a block diagram of an exemplary system for binding one or more preferred CPUs to a virtual partition of a computer, according to one embodiment.

FIG. 1 illustrates a block diagram of an exemplary system 100 for binding one or more preferred CPUs to a virtual partition of a computer, according to one embodiment. The system 100 may be the computer based on a NUMA. As illustrated, the computer is partitioned into a virtual partition 102 and a virtual partition 104. The computer may be also be partitioned into more than two virtual partitions based on user requirement. The system 100 also includes a virtual partition monitor 106, a virtual partition database 108 and an advisory module 110.

As illustrated, the virtual partition 102 is assigned with a boot CPU 112, CPUs 114-118 and a memory 120 for running its OS instance. It is appreciated that, the boot CPU 112 may be assigned to the virtual partition 102 during creation of the virtual partition 102. The CPUs 114-118 may be assigned to the virtual partition 102 during the boot time of the virtual partition 102 or the virtual partition monitor 106 as well as at run time of the virtual partition 102. The CPUs 114-118 of the virtual partition 102 may be preferred CPUs or non-preferred CPUs and may be assigned by the virtual partition monitor 106.

The virtual partition 104 is assigned with a boot CPU 122, a CPU 124 and a memory 126 for running its OS instance. It is appreciated that, the boot CPU 122 may be assigned to the virtual partition 104 during creation of the virtual partition 104. The CPU 124 may be assigned to the virtual partition 104 during the boot time of the virtual partition 104 or the virtual partition monitor 106 as well as at run time of the virtual partition 104. Further, the CPU 124 of the virtual partition 104 may be a preferred or non-preferred CPU and is assigned by the virtual partition monitor 106.

A preferred CPU may be a CPU which is marked with an attribute associated with a hardware path of the CPU. The attribute may indicate a preference of the CPU over other CPUs during assignment to a virtual partition. The CPU preference may be specified using virtual partition commands, for example, for creating or modifying the virtual partition. When a CPU preference is specified, the virtual partition monitor 106 may create soft binding of the preferred CPU with the virtual partition.

The soft binding of the preferred CPU may facilitate assigning of the preferred CPU to the virtual partition at the boot time of the virtual partition and maintaining of the preferred CPU across virtual partition and/or virtual partition monitor reboots. It can be noted that, the preferred CPU which are soft bound may be assigned to another virtual partition based on a request by a user.

Further, each preferred CPU may be stored as a record in a respective preferred CPU table in the virtual partition database 108 when the soft binding of the preferred CPU with the virtual partition is created. For example, the record may indicate a hardware path of a particular CPU and the attribute of the particular CPU as the preferred CPU.

In the example embodiment illustrated in FIG. 1, the virtual partition database 108 includes the preferred CPU table 128 for the virtual partition 102. The preferred CPU table 128 includes a record number column 130, a preferred CPU identifier column 132 and a hardware path column 134. It can be seen that, the preferred CPU column 132 shows preferred CPUs for the virtual partition 102 as the CPU 114 and the CPU 118. Further, the hardware path associated with the CPU 114 and the CPU 118 are specified as 1.02 and 1.04 respectively in the hardware path column 134. Thus, the CPU 114 and the CPU 118 may be marked as preferred CPUs for the virtual partition 102. Similarly, preferred CPUs for the virtual partition 104 may be stored as records in a preferred CPU table for the virtual partition 104.

In accordance with the above-described embodiments, the virtual partition monitor 106 may manage the virtual partition 102, the virtual partition 104 and respective OS instances. In one embodiment, the virtual partition monitor 106 may determine and assign preferred CPUs to the virtual partition 102 and the virtual partition 104. In an exemplary implementation, the virtual partition monitor 106 may assign the preferred CPUs during a reboot of the virtual partition 102, the virtual partition 104 and the virtual partition monitor 106.

During a reboot of the virtual partition 102 and/or the virtual partition 104, the virtual partition monitor 106 may look up the corresponding preferred CPU tables in the virtual partition database 108. Further, the virtual partition monitor 106 may determine and assign the preferred CPUs to the rebooted virtual partition. Also, during a reboot of the virtual partition monitor 106, the virtual partition monitor 106 may look up the corresponding preferred CPU tables in the virtual partition database 108. Then, the virtual partition monitor 106 may determine and assign the preferred CPUs to the virtual partition 102 and the virtual partition 104. Thus, the virtual partition monitor 106 ensures that the preferred CPUs are retained in the virtual partition 102 and the virtual partition 104 across reboots.

In another embodiment, the virtual partition monitor 106 may assign a preferred CPU to the virtual partition 102 or the virtual partition 104 during a run time of the virtual partition 102 and the virtual partition 104. The virtual partition monitor 106 may assign the preferred CPU upon a receipt of a request to assign an additional CPU to one of the virtual partition 102 and the virtual partition 104. In this embodiment, the advisory module 110 may determine which one of available CPUs is to be marked as a preferred CPU for assigning to the one of the virtual partition 102 and the virtual partition 104. For example, the preferred CPU may be determined based on current CPU assignment and availability of the CPUs. The preferred CPU may also be determined based on parameters such as performance, power optimization and the like. These parameters may be provided by the virtual partition monitor 106.

Then, the virtual partition monitor 106 may assign the preferred CPU to the one of the virtual partition 102 and the virtual partition 104. The preferred CPU may be stored as a record in a respective preferred CPU table in the virtual partition database 108. On the contrary, if the preferred CPU assigned to the one of the virtual partition 102 and the virtual partition 104 is reassigned to another virtual partition, then corresponding record in the preferred CPU table may be deleted.

Figure 2:
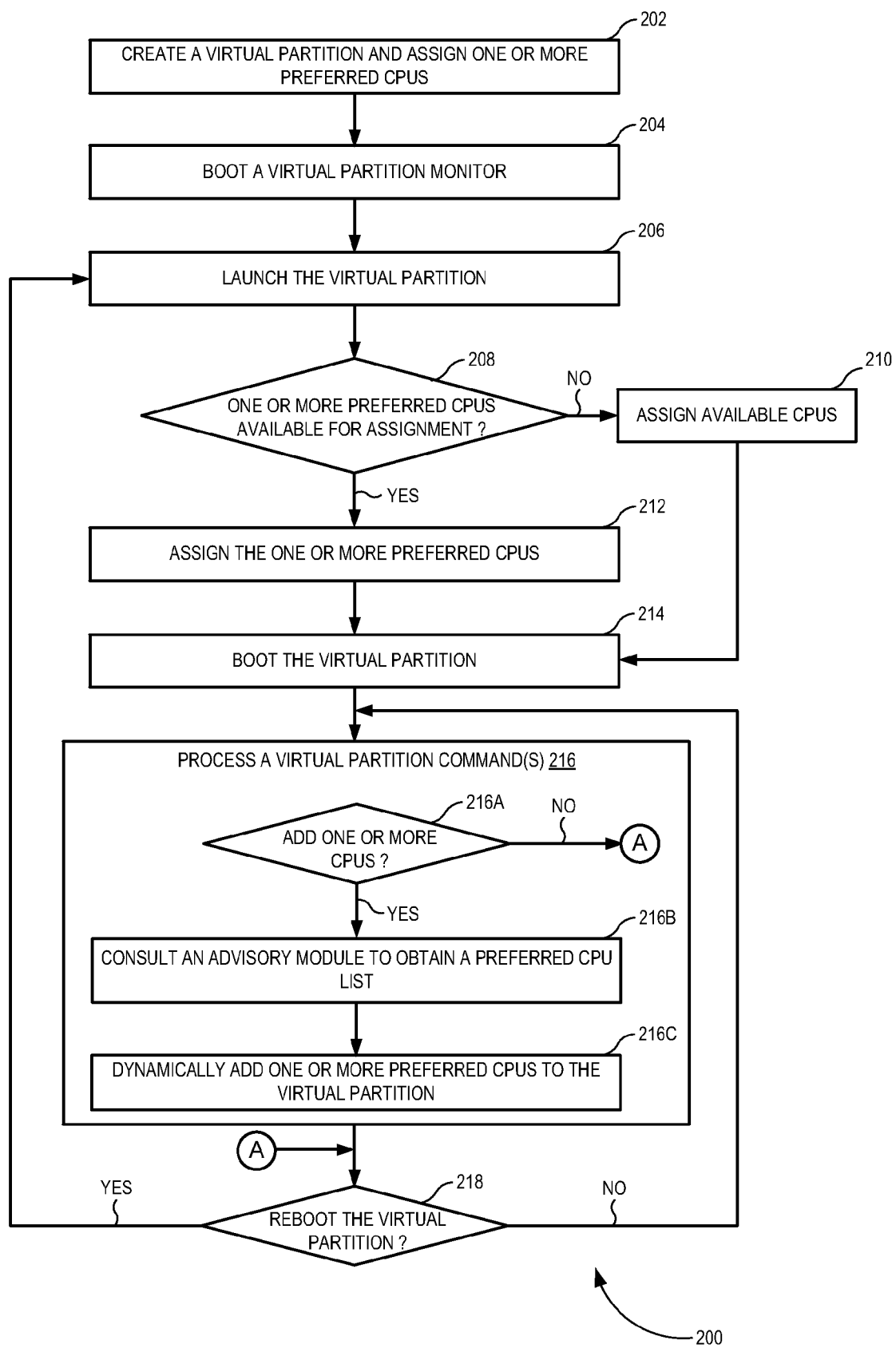
FIG. 2 illustrates an exemplary computer implemented process diagram for binding one or more preferred CPUs to a virtual partition of a computer, according to one embodiment.

FIG. 2 illustrates an exemplary computer implemented process diagram 200 for binding one or more preferred CPUs to a virtual partition of a computer, according to one embodiment. At step 202, a virtual partition on the computer is created and one or more preferred CPUs are assigned to the virtual partition. In one example embodiment, a request may be received for assigning the preferred CPUs to the virtual partition. Upon receipt of the request, the preferred CPUs may be determined for assigning to the virtual partition. Each of the preferred CPUs may be determined by capturing a hardware path of a particular CPU based on a virtual partition command. For example, the virtual partition command may specify a preference for the particular CPU. Then, the particular CPU may be marked with an attribute which identifies the particular CPU as the preferred CPU.

Once the preferred CPUs are determined, the preferred CPUs may be assigned to the virtual partition. Also, a record which includes the hardware path of the particular CPU and the attribute of the particular CPU may be stored in a virtual partition database. Alternatively, when the particular CPU is reassigned or migrated to a different virtual partition, the record is deleted from the virtual partition database.

At step 204, a virtual partition monitor is booted. At step 206, the virtual partition is launched. At step 208, it is determined whether one or more preferred CPUs are available for assignment to the virtual partition. If there isn't any preferred CPU available for assignment, then step 210 is performed. At step 210, a specified number of CPUs from available CPUs are randomly assigned to the virtual partition, if it is called for. If there are preferred CPUs available for assignment, then step 212 is performed. At step 212, a specified number of preferred CPUs are assigned to the virtual partition from available preferred CPUs. Once the preferred CPUs and/or the available CPUs are assigned to the virtual partition, the virtual partition is booted at step 214.

At step 216, a virtual partition command(s) associated with the virtual partition is processed. For example, at step 216A, it is determined whether the virtual command(s) is associated with addition of one or more CPUs to the virtual partition. If it is determined that the virtual partition command(s) is associated with the addition of one or more CPUs, then step 216B is performed. At step 216B, an advisory module is consulted to obtain a list of preferred CPUs. The advisory module may determine a preferred CPU by identifying a memory assigned to the virtual partition. Then, a locality of the one or more CPUs with respect to the memory may be determined and the CPU may be marked with an attribute which identifies the CPU as the preferred CPU. In this manner, the advisory module may create the list of preferred CPUs including one or more preferred CPUs for assignment to the virtual partition.

At step 216C, the one or more preferred CPUs are dynamically added to the virtual partition based on the list of preferred CPUs. The one or more preferred CPUs may be assigned to the virtual partition such that the one or more preferred CPUs are local to a memory of a cellular platform of the computer. This may facilitate faster memory access in the virtual partition.

Each of the one or more preferred CPUs assigned to the virtual partition may be stored as a record in the virtual partition database. It can be noted that, when each of the one or more preferred CPUs is reassigned to a different virtual partition, the record may be deleted from the virtual partition database. It is appreciated that, the step 216 is performed during a run time of the virtual partition.

If it is determined at step 216A that, the virtual partition command(s) is not associated with the addition of one or more CPUs, then step 218 is performed. At step 218, it is determined whether the virtual partition is to be rebooted. If it is determined that the virtual partition is to be rebooted, then step 206 is performed. Otherwise step 216 is performed. According to an embodiment of the present invention, the one or more preferred CPUs assigned to the virtual partition may be retained in the virtual partition during the reboot of the virtual partition.

Figure 3:
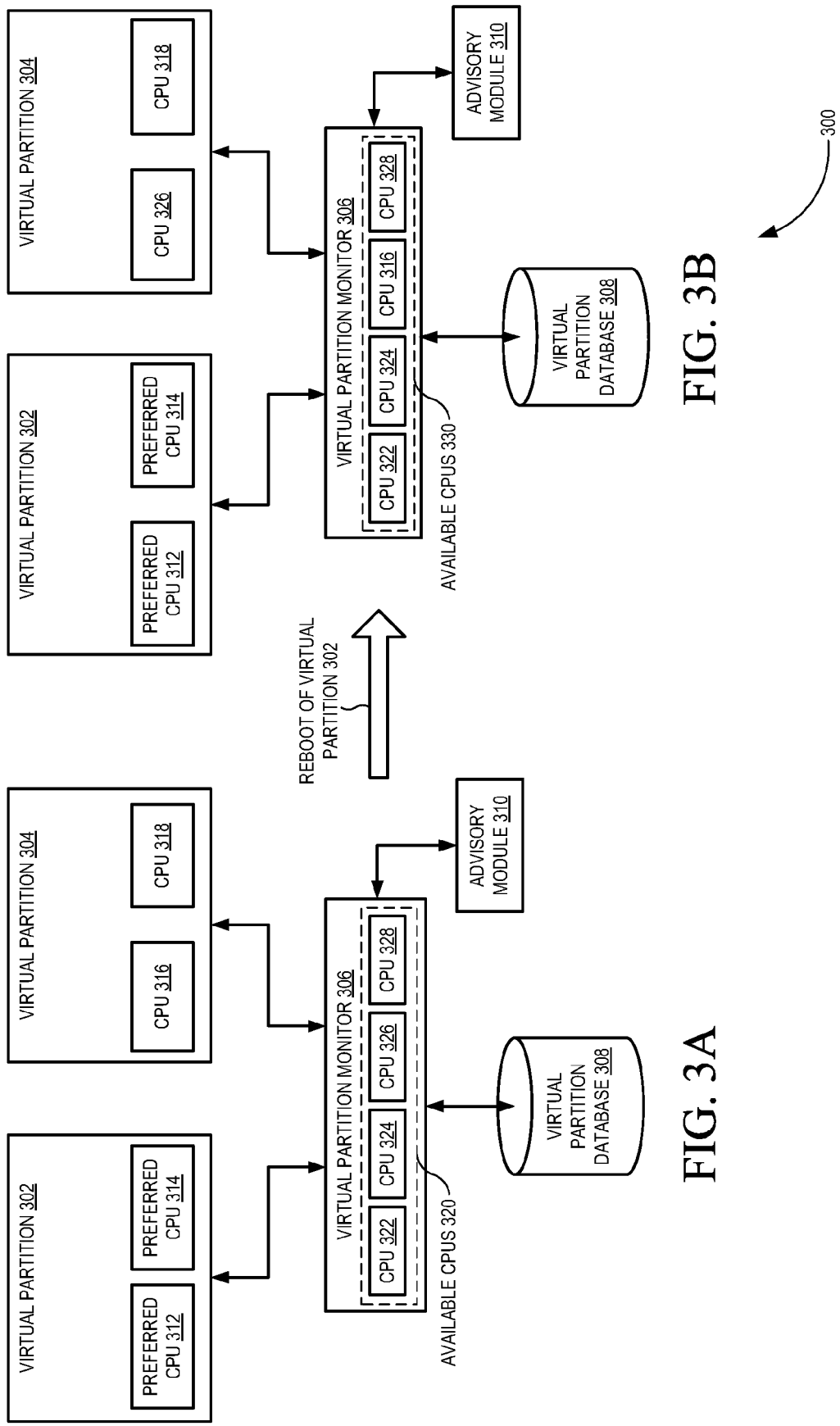
FIG. 3A and FIG. 3B illustrate an exemplary process for retaining one or more preferred CPUs assigned to a virtual partition of a computer upon a reboot of the virtual partition, according to one embodiment.

FIG. 3A and FIG. 3B illustrate an exemplary process 300 for retaining one or more preferred CPUs assigned to a virtual partition of a computer upon a reboot of the virtual partition, according to one embodiment. Particularly, FIG. 3A illustrates a virtual partition 302, a virtual partition 304, a virtual partition monitor 306, a virtual partition database 308 and an advisory module 310. As illustrated, the virtual partition 302 includes a preferred CPU 312 and a preferred CPU 314. The virtual partition 302 may also include other resources such as memory, I/O interfaces, and the like (not shown in FIG. 3A). The virtual partition 304 includes a non-preferred CPU 316 and a non-preferred CPU 318 along with other resources such as memory, I/O interfaces and the like (not shown in FIG. 3A).

According to an embodiment of the present invention, the preferred CPU 312 and the preferred CPU 314 are retained in the virtual partition 302 during the reboot of the virtual partition 302, as illustrated in FIG. 3B. This may be due to soft binding of the preferred CPU 312 and the preferred CPU 314 to the virtual partition 302. The soft binding may be created when the CPU 312 and the CPU 314 are marked with an attribute that identifies the CPUs as preferred CPUs. The preferred CPU 312 and the preferred CPU 314 may be stored as records in the virtual partition database 308. During the reboot of the virtual partition 302, the virtual partition monitor 306 may look up the virtual partition database 308 for the stored records and may retain the preferred CPU 312 and the preferred CPU 314 based on the records in the virtual partition database 308.

When the virtual partition 304 reboots, the virtual partition monitor 306 may assign CPUs randomly from the available CPUs 320. This is because there is no preferred CPU assigned to the virtual partition 304 before rebooting, as illustrated in FIG. 3A. As illustrated in FIG. 3B, after reboot of the virtual partition 304, the virtual partition 304 is assigned with the CPU 318 and a CPU 326. As a result, available CPUs 330 in the virtual partition monitor 306 include CPUs 322, 324, 316 and 328 which can be assigned to other virtual partitions based on a user request(s).

Figure 4:
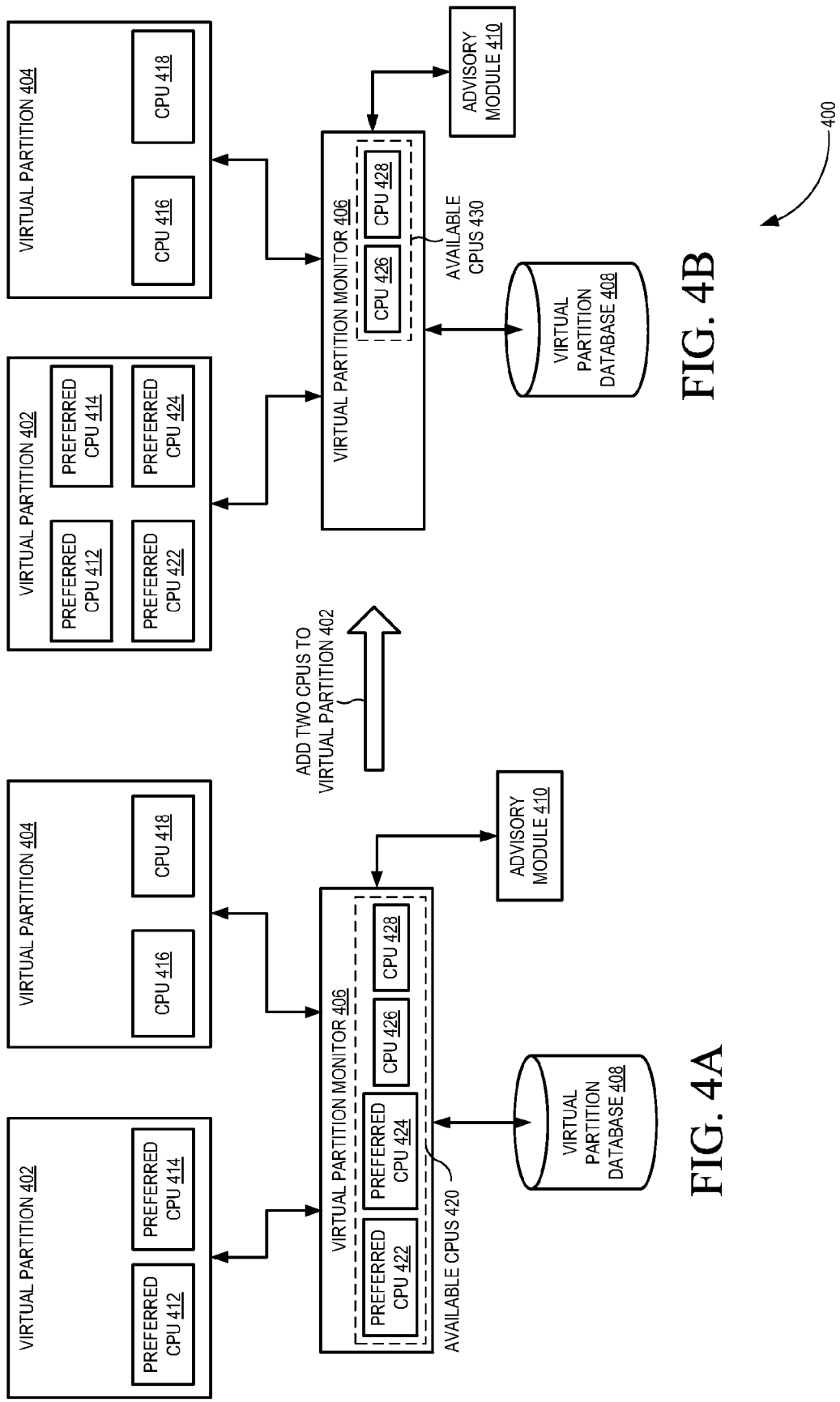
FIG. 4A and FIG. 4B illustrate an exemplary process for dynamically adding one or more CPUs to a virtual partition of a computer, according to one embodiment.

FIG. 4A and FIG. 4B illustrate an exemplary process 400 for dynamically adding one or more CPUs to a virtual partition of a computer, according to one embodiment. Particularly, FIG. 4A illustrates a virtual partition 402, a virtual partition 404, a virtual partition monitor 406, a virtual partition database 408 and an advisory module 410. As illustrated, the virtual partition 402 includes a preferred CPU 412 and a preferred CPU 414. The virtual partition 402 may also include other resources such as memory, I/O interfaces, and the like (not shown in FIG. 4A). The virtual partition 404 includes a non-preferred CPU 416 and a non-preferred CPU 418 along with other resources such as memory, I/O interfaces and the like (not shown in FIG. 4A).

During the run time of the virtual partition 402, the advisory module 410 may receive a request for assigning two additional CPUs to the virtual partition 402. The advisory module 410 may then determine which of two CPUs from available CPUs 420 are to be marked as preferred CPUs. The determination may be based on current CPU assignment to the virtual partition 402 and availability of CPUs. The determination may also be based on parameters such as performance, power optimization and the like.

As illustrated, the available CPUs 420 includes a CPU 422 and a CPU 424 which are marked as preferred CPUs by the advisory module 410. Thus, during the run time of the virtual partition monitor 406, the virtual partition monitor 406 may assign the preferred CPU 422 and the preferred CPU 424 to the virtual partition 402, as illustrated in FIG. 4B. Upon assignment of the preferred CPU 422 and the preferred CPU 424 to the virtual partition 402, available CPUs 430 include a CPU 426 and a CPU 428, as illustrated in FIG. 4B.

Figure 5:
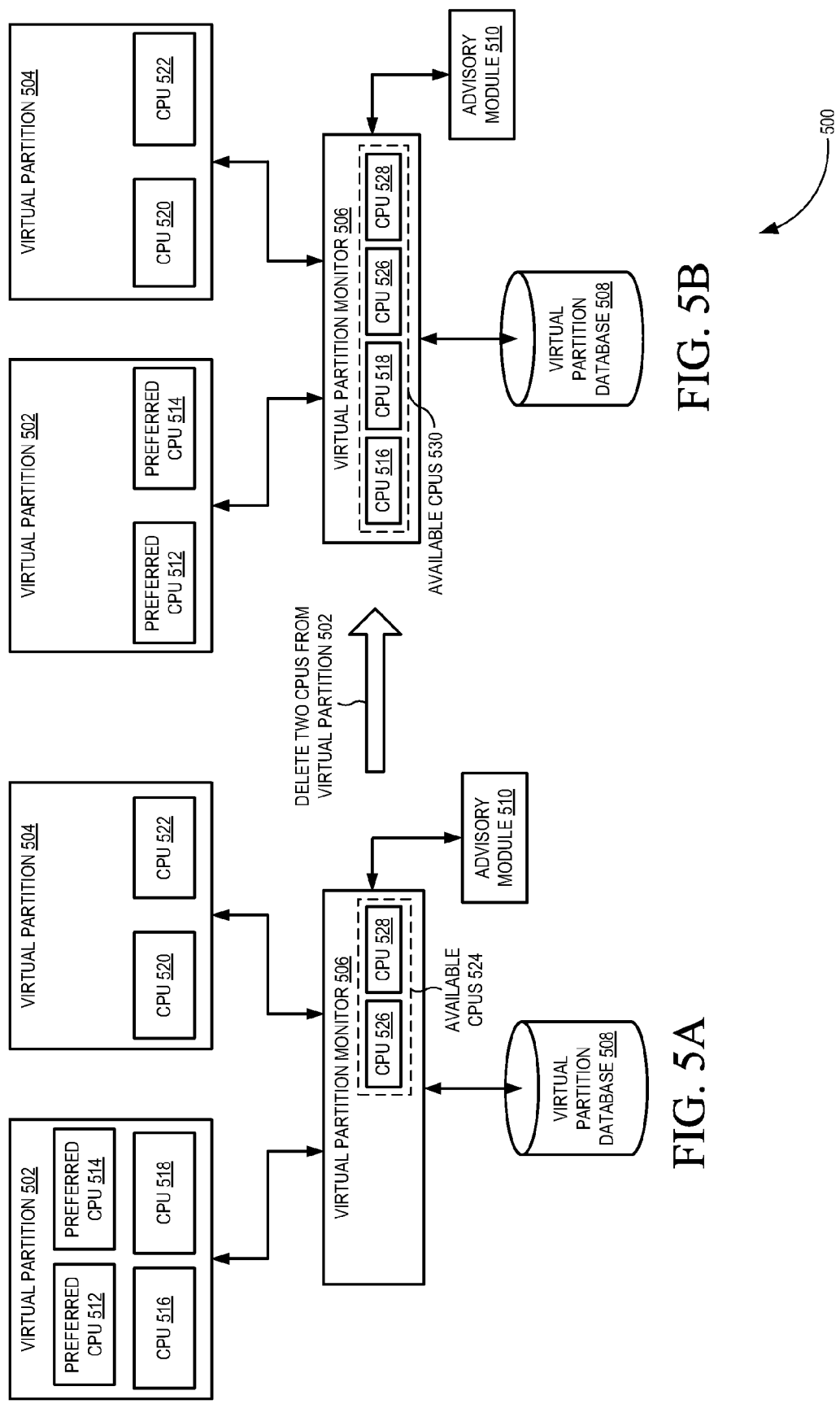
FIG. 5A and FIG. 5B illustrate an exemplary process for dynamically deleting one or more CPUs from a virtual partition of a computer, according to one embodiment.

FIG. 5A and FIG. 5B illustrate an exemplary process 500 for dynamically deleting one or more CPUs from a virtual partition of a computer, according to one embodiment. Particularly, FIG. 5A illustrates a virtual partition 502, a virtual partition 504, a virtual partition monitor 506, a virtual partition database 508 and an advisory module 510. As illustrated, the virtual partition 502 includes a preferred CPU 512, a preferred CPU 514, a non-preferred CPU 516 and a non-preferred CPU 518. The virtual partition 502 may also include other resources such as memory, I/O interfaces, and the like (not shown in FIG. 5A). The virtual partition 504 includes a non-preferred CPU 520 and a non-preferred CPU 522 along with other resources, such as memory, I/O interfaces, and the like (not shown in FIG. 5A).

During the run time of the virtual partition 502, the advisory module 510 may receive a request for deleting two CPUs from the virtual partition 502. In such a case, the advisory module 510 may determine which of the two CPUs are to be deleted from the virtual partition 502. According to an embodiment of the present invention, the CPU 516 and the CPU 518 are preferred to the preferred CPU 512 and the preferred CPU 514 for deleting from the virtual partition 502. If needed, the preferred CPU 512 and the preferred CPU 514 may be also deleted.

Thus, as illustrated in FIG. 5B, the non-preferred CPU 516 and the non-preferred CPU 518 are deleted from the virtual partition 502 by the virtual partition monitor 506. The deleted CPUs 516 and 518 may be added to available CPUs 530 or may be reassigned to other virtual partition(s) based on a user request(s). It can be noted that, when the CPU 516 and the CPU 518 are deleted from the virtual partition 502, corresponding records may also be deleted from the virtual partition database 508.

Figure 6:
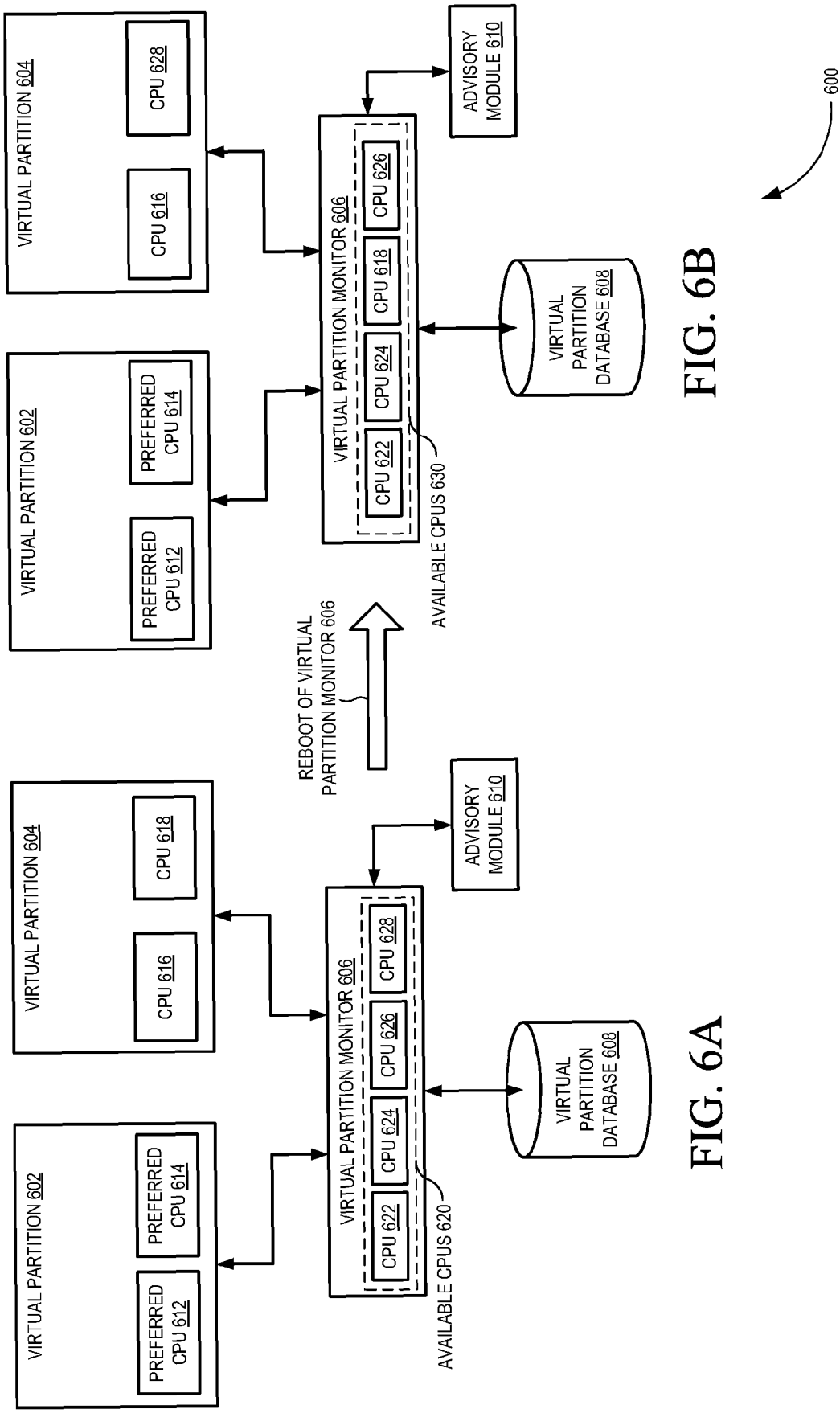
FIG. 6A and FIG. 6B illustrate an exemplary process for retaining one or more CPUs assigned to a virtual partition of a computer upon a reboot of a virtual partition monitor, according to one embodiment.

FIG. 6A and FIG. 6B illustrate an exemplary process 600 for retaining one or more CPUs assigned to a virtual partition of a computer upon a reboot of a virtual partition monitor 606, according to one embodiment. Particularly, FIG. 6A illustrates a virtual partition 602, a virtual partition 604, the virtual partition monitor 606, a virtual partition database 608 and an advisory module 610. As illustrated, the virtual partition 602 includes a preferred CPU 612 and a preferred CPU 614. The virtual partition 602 may also include other resources such as memory, I/O interfaces, and the like (not shown in FIG. 6A). The virtual partition 604 includes a non-preferred CPU 616 and a non-preferred CPU 618 along with other resources such as memory, I/O interfaces and the like (not shown in FIG. 6A).

When the virtual partition monitor is rebooted, the virtual partition 602 and the virtual partition 604 may also be rebooted. According to an embodiment of the present invention, the preferred CPU 612 and the preferred CPU 614 are retained in the virtual partition 602 during the reboot of the virtual partition 602, as illustrated in FIG. 6B. This may be due to soft binding of the preferred CPU 612 and the preferred CPU 614 to the virtual partition 602. The soft binding may be created when the preferred CPU 612 and the preferred CPU 614 are marked with an attribute that identifies the CPUs as preferred CPUs. Further, the preferred CPU 612 and the preferred CPU 614 may be stored as records in the virtual partition database 608. During the reboot, the virtual partition monitor 606 may look up the virtual partition database 608 for the stored records and may retain the preferred CPU 612 and the preferred CPU 614 in the virtual partition 602 based on the records.

Similarly, when the virtual partition 604 reboots, the virtual partition monitor 606 may assign CPUs randomly from the available CPUs 620. This is because there may be no preferred CPUs assigned to the virtual partition 604 before reboot. As illustrated in FIG. 6B, after reboot of the virtual partition 604, the virtual partition 604 is assigned with the CPU 616 and the CPU 628 and thus, available CPUs 630 include CPUs 622, 624, 618 and 626 which may be assigned to other virtual partition based on a user request(s).

Figure 7:
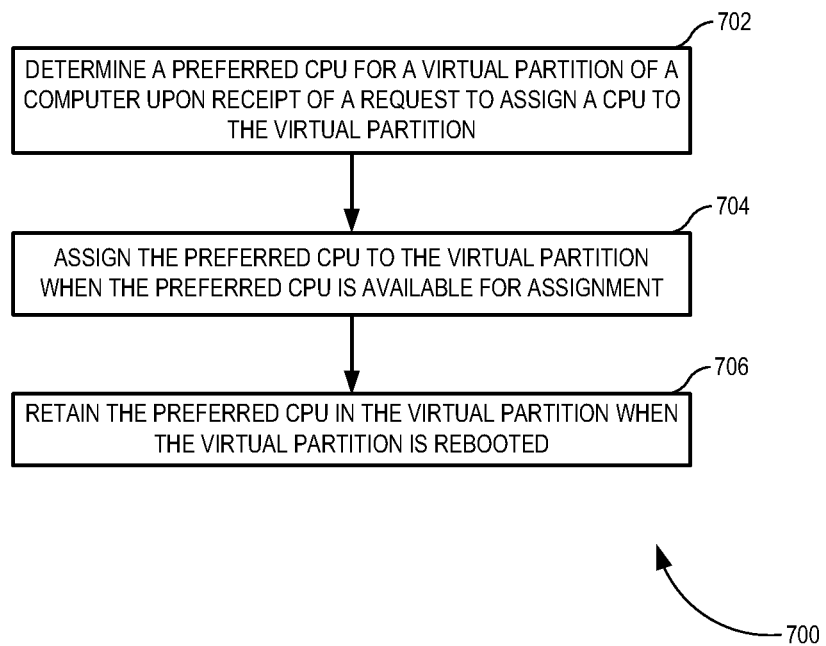
FIG. 7 illustrates a process flow chart of an exemplary method for binding one or more preferred CPUs to a virtual partition of a computer, according to one embodiment.

FIG. 7 illustrates a process flow chart 700 of an exemplary method for binding one or more preferred CPUs to a virtual partition of a computer, according to one embodiment. In operation 702, a preferred CPU for the virtual partition on the computer is determined upon a receipt of a request to assign a CPU to the virtual partition. In operation 704, the preferred CPU is assigned to the virtual partition when the preferred CPU is available for assignment to the virtual partition. In operation 706, the preferred CPU is retained in the virtual partition when the virtual partition is rebooted.

Figure 8:
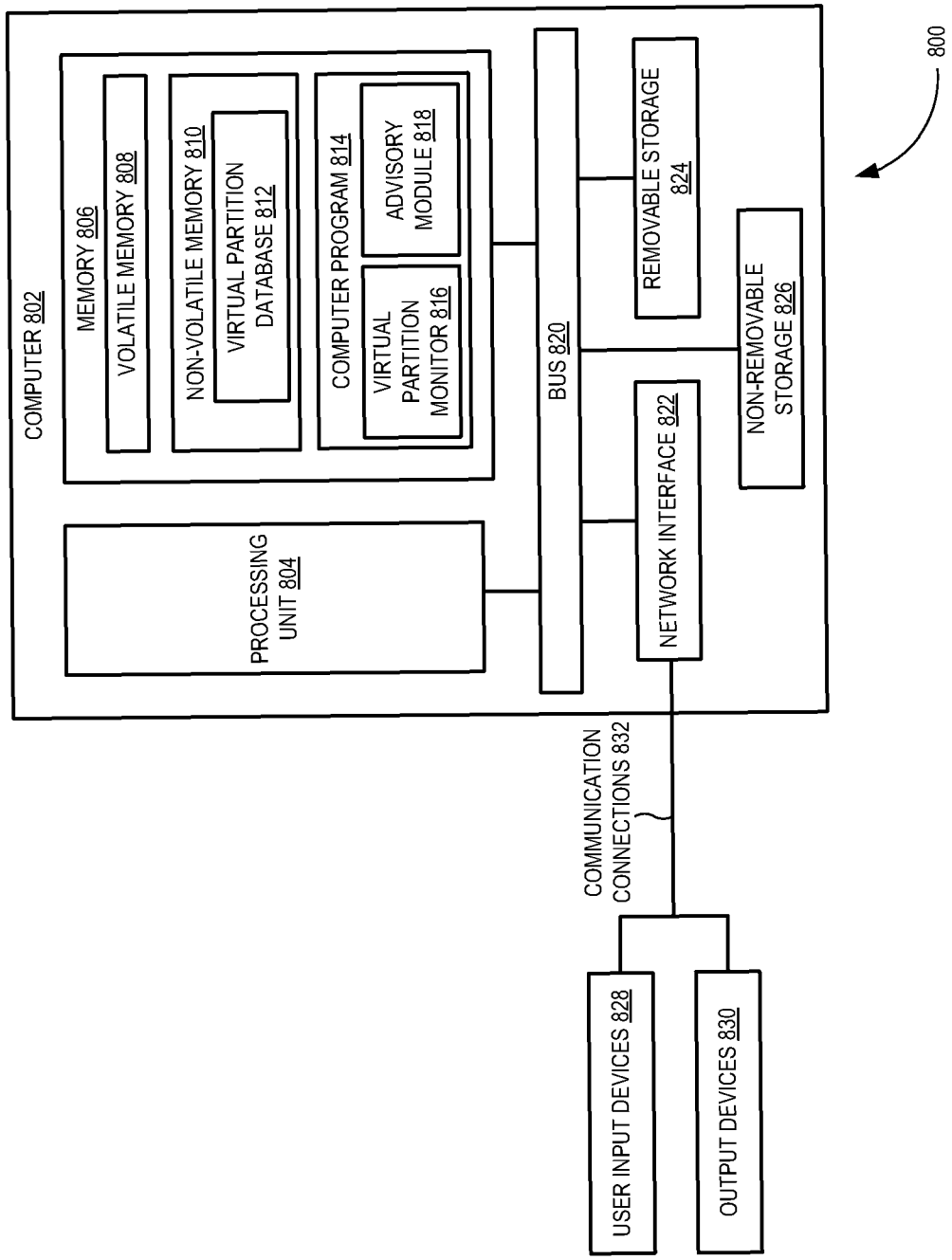
FIG. 8 shows an example of a suitable computing system environment for implementing embodiments of the present subject matter.

FIG. 8 shows an example of a suitable computing system environment 800 for implementing embodiments of the present subject matter. FIG. 8 and the following discussion are intended to provide a brief, general description of a suitable computing environment in which certain embodiments of the inventive concepts contained herein may be implemented.

A general computing device, in the form of a computer 802, may include a processing unit 804, a memory 806, a removable storage 824, and a non-removable storage 826. The computer 802 additionally includes a bus 820 and a network interface 822. The computer 802 may include or have access to a computing environment that includes one or more user input devices 828, one or more output devices 830, and one or more communication connections 832 such as a network interface card or a universal serial bus connection.

The one or more user input devices 828 may be a digitizer screen and a stylus and the like. The one or more output devices 830 may be a display device of computer, a computer monitor, and the like. The computer 802 may operate in a networked environment using the communication connection 832 to connect to one or more remote computers. A remote computer may include a personal computer, a server, a work station, a router, a network personal computer, a peer device or other network nodes, and/or the like. The communication connection 832 may include a local area network, a wide area network, and/or other networks.

The memory 806 may include a volatile memory 808 and a non-volatile memory 810. A variety of computer-readable media may be stored in and accessed from the memory elements of the computer 802, such as the volatile memory 808 and the non-volatile memory 810, the removable storage 824 and the non-removable storage 826. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 804, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 804 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media may be executable by the processing unit 804 of the computer 802. For example, a computer program 814 may include machine-readable instructions capable of binding preferred CPUs to a virtual partition of the computer 802 according to the teachings and herein described embodiments of the present subject matter. In one embodiment, the computer program 814 may be included on a CD-ROM and loaded from the CD-ROM to a hard drive in the non-volatile memory 810. The machine-readable instructions may cause the computer 802 to encode according to the various embodiments of the present subject matter.

As shown, the computer program 814 includes a virtual partition monitor 816 and an advisory module 818. The virtual partition monitor 816 may assign the preferred CPUs to the virtual partition of the computer 802. The advisory module 818 may determine a preferred CPU for the virtual partition during a run time of the virtual partition upon a receipt of a request to assign an additional CPU to the virtual partition. Further, the preferred CPUs may be stored as records in a virtual partition database 812 included in the non-volatile memory 810.

For example, the computer-readable medium for binding a preferred CPU to a virtual partition of the computer 802 has instructions that, when executed by the computer 802, may cause the computer to perform a method, in which a preferred CPU for a virtual partition of a computer may be determined upon a receipt of a request to assign a CPU to the virtual partition. Then, the preferred CPU may be assigned to the virtual partition when the preferred CPU is available for assignment. Further, the preferred CPU may be retained in the virtual partition when the virtual partition is rebooted. The operation of the computer 802 for binding the preferred CPUs to the virtual partition is explained in greater detail with reference to FIGS. 1-8.

Although, the foregoing description is described in greater detail with respect to preferred CPU binding on virtual partitions, one can envision that the present invention may be extended to binding of preferred resources such as I/O interfaces, memory and the like. Also, the present invention may be extended to virtualization technologies which provide support for sub-CPU granularity.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method comprising:
    determining a first preferred CPU for a virtual partition on a computer upon a receipt of a first request to assign a CPU to the virtual partition, wherein the first preferred CPU is automatically determined based on operational parameters of the computer;
    assigning the first preferred CPU to the virtual partition when the first preferred CPU is available for assignment;
    in response to a second request to assign a CPU to the virtual partition, assigning a non-preferred CPU of plural available non-preferred CPUs to the virtual partition;
    while the first preferred CPU and the non-preferred CPU are assigned to the virtual partition, storing information in a virtual partition database to indicate that said first preferred CPU is a preferred CPU for the virtual partition and that said non-preferred CPU is a non-preferred CPU for the virtual partition; and
    upon reboot of the virtual partition and based on the information in the virtual partition database, preferentially retaining the first preferred CPU in the virtual partition and randomly assigning a specified number of the available non-preferred CPUs to the virtual partition.

2. The method of claim 1, wherein the assigning the first preferred CPU is performed during a boot time of the virtual partition.

3. The method of claim 2, wherein the determining the first preferred CPU comprises:
    capturing a hardware path of a particular CPU upon a receipt of a virtual partition command specifying a preference for the particular CPU; and
    marking the particular CPU with an attribute which identifies the particular CPU as the first preferred CPU.

4. The method of claim 3, wherein the assigning the first preferred CPU further includes storing, in the virtual partition database, a record which includes the hardware path of the particular CPU and the attribute of the particular CPU as the first preferred CPU associated with the virtual partition.

5. The method of claim 4, further comprising deleting the record when the particular CPU is reassigned to a different virtual partition.

6. The method of claim 1, wherein the assigning the first preferred CPU is performed during a runtime.

7. The method of claim 6, wherein the determining the first preferred CPU comprises:
    identifying a memory assigned to the virtual partition;
    determining a locality of the CPU with respect to the memory; and
    marking the particular CPU with an attribute which identifies the particular CPU as the first preferred CPU.

8. The method of claim 7, wherein the assigning the first preferred CPU further includes storing, in the virtual partition database, a record which identifies the particular CPU as the first preferred CPU.

9. The method of claim 8, further comprising deleting the record when the particular CPU is reassigned to a different virtual partition.

10. The method of claim 1, wherein the retaining the first preferred CPU in the virtual partition is performed when a virtual partition monitor of the virtual partition is rebooted.

11. A system comprising non-transitory media encoded with code that, when executed by a processor, causes the processor to implement the method of claim 1.

* * * * *